June 27, 1967 J. BAUDE 3,328,664
TRANSISTOR REVERSE CURRENT PROTECTIVE CIRCUIT
Filed May 8, 1964
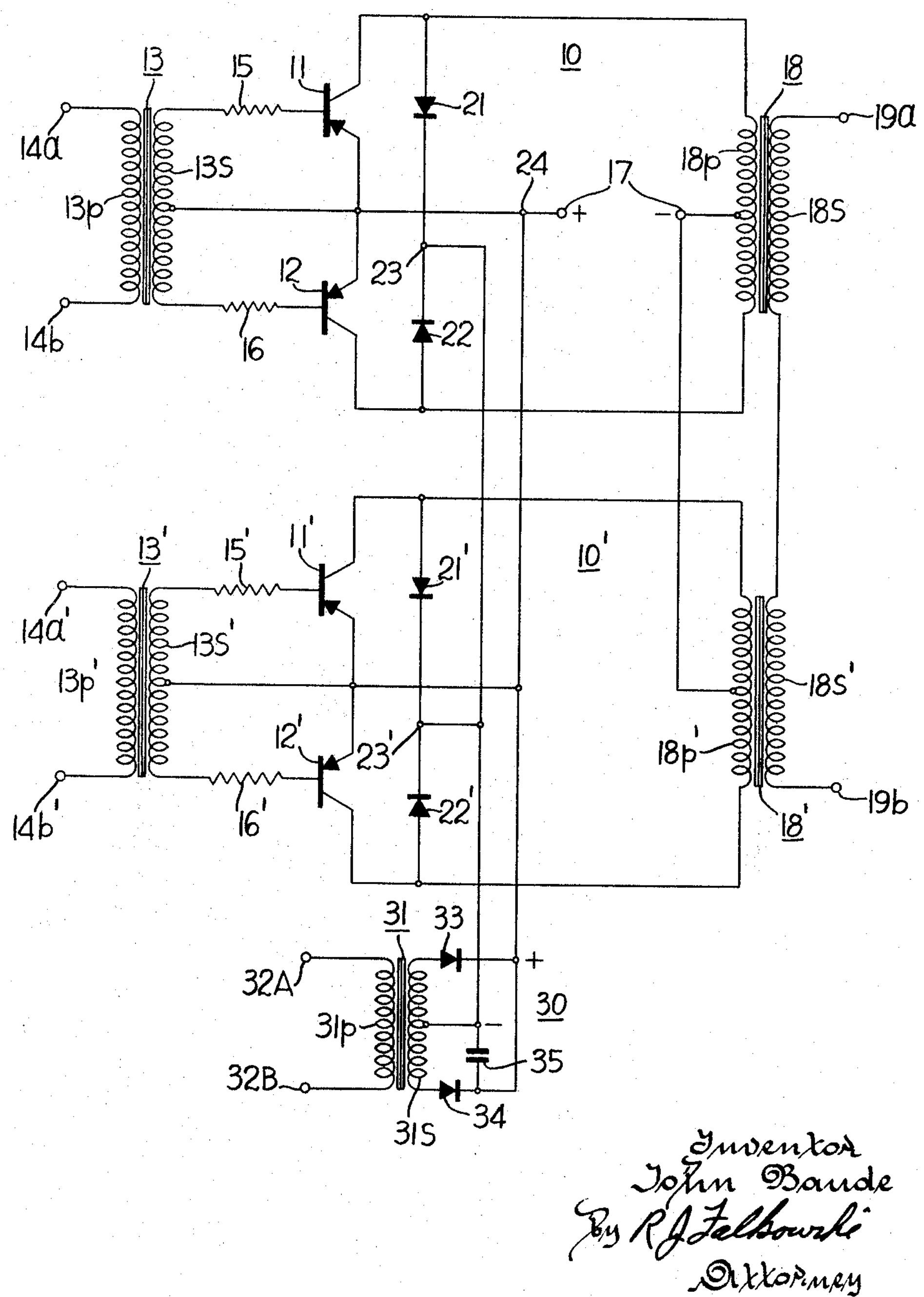
Inventor
John Baude
By R J Falkowski
Attorney 3,328,664
TRANSISTOR REVERSE CURRENT PROTECTIVE CIRCUIT John Baude, Milwaukee, Wis., assignor to Allis-Chalmers Manufacturing Company, Milwaukee, Wis.

Filed May 8, 1964, Ser. No. 366,062
8 Claims. (Cl. 321—11)

ABSTRACT OF THE DISCLOSURE

A power inverter circuit powered by a direct current source has two transistors in push-pull arrangement controlled by a signal from a center tap input transformer alternately turning on the transistors. Diodes are connected across the output circuits of the transistors in a direction opposite to the conduction direction of the output circuits of the transistors. Auxiliary power derived from a rectified and filtered alternating source is applied across the diodes in a direction to provide a substantially continuous direct voltage across the diodes that forward biases the diodes at a preselected level.

This invention relates to transistor power conversion systems, particularly to inverters that provide for reverse current protection of the output transistors.

Transistor inverters generally use power output transistors in a push-pull arrangement to produce alternating current from a direct current source. In circuits that energize a power factor load, the current is not in phase with the voltage and reverse current cyclically flows through the output transistors. Sufficiently high reverse current through a transistor may cause thermal or secondary breakdown of the transistor.

The reverse current problem is particularly severe in multistage inverters because current is generated by the different stages of the inverters at different times and the turning on of one stage produces a large reverse current in other stages.

While high current transistors are capable of carrying a considerable amount of reverse current without being damaged, it is still highly desirable in many applications to assure limitation of the magnitude of any reverse currents that may occur to provide protection for the transistor. For limited protection of the transistors a diode may be connected across the emitter-collector or output circuit of each transistor to conduct reverse currents past the transistor. However, this is not satisfactory in some inverter systems, particularly multistage inverter systems.

When diodes are used to conduct reverse current they carry a current that may even be as high as full load current. Therefore, the diodes must be of the silicon type since germaniun diodes are not manufactured or available for currents of the magnitudes generally encountered. The voltage drop across a silicon diode for the current magnitudes that are encountered in some systems can be in excess of the maximum allowable voltage drop across the emitter-collector of the transistor.

For example, a power transistor may have a current amplification factor of fifty in the forward direction so that a base current of one ampere permits an emitter-collector current flow of fifty amperes in the forward direction. However, the amplification factor in the reverse direction may be on the order of five. As a result, the voltage drop across the transistor with five amperes flowing in the reverse direction is the same as the voltage drop with fifty amperes flowing in the forward direction. To the degree that the reverse current exceeds that level, the voltage drop across the emitter-collector may exceed the safe thermal limit of the transistor.

A typical transistor might have a .2 voltage drop at maximum normal operating current, that is, with a base current of one ampere and a current of fifty amperes in the forward direction or a reverse current of five amperes. A typical silicon diode may have a voltage drop of about nine tenths to one volt with five amperes of current. This voltage drop exceeds two tenths of a volt, the preferable limit for the transistor, by a significant amount that rapidly increases as the current increases. As a result, a substantial portion of the total current flows through the transistor and can cause burnout of the transistor.

In accordance with this invention, diodes are connected across the emitter-collector circuits of the output transistors poled in the opposite direction to the normal flow of current through the emitter-collector circuits. An auxiliary power source is connected in series with the diodes to forward bias them a predetermined amount so that the portion of reverse current that flows through the diodes is greatly increased. Therefore, the reverse current flowing through the emitter-collector of the transistor is relatively decreased for a particular reverse current.

In multistage inverters reverse current flows through a transistor when it is turned on because the other stages are sequentially switched on to create current flowing in a reverse direction relative to the turned on transistor at cyclically recurring times. These reverse currents generally increase in magnitude as the number of stages increase. By use of forward biasing according to this invention the reverse current through the transistors can be practically eliminated for any number of inverter power stages and for any type of reactive load with a single stage inverter.

The objects of this invention are: to provide a new and improved power inverter circuit; to provide a power inverter circuit that protects the output transistors from reverse currents; to provide a transistor inverter circuit that bypasses substantially all of any reverse current (relative to any transistor) in the inverter past the transistors; and to provide a power inverter circuit that may be utilized in a multistage power inverter system without danger of excessive reverse current flowing through any of the output transistors.

Advantages and other objects will appear from the following detailed description.

The figure is a schematic drawing of a power inverter circuit embodying this invention.

Referring to the figure, a multistage power inverter system comprises two power inverters 10 and 10′ which are substantially identical and which are utilized to provide an alternating stepped output to output terminals 19*a* and 19*b*.

Inverter stages and 10 and 10′ are identical and similar numbering references are used for the corresponding components.

Power inverter 10 has two power output semiconductors, such as transistors 11 and 12, connected in push-pull arrangement with an output transformer 18. An input transformer 13 receives an alternating input across terminals 14*a* and 14*b* that appears across primary winding 13*p* of transformer 13 to provide a control signal at secondary winding 13*s* for alternately turning on power transistors 11 and 12, as known in the art. Since the transistors are shown as PNP type transistors, transistors 11 and 12 turn on when their repective bases become negative across a resistor 15 and a resistor 16, respectively.

In inverter stage 10' the signal appearing at terminals **14*a'* and 14*b'* has a predetermined time relation to the signals appearing at terminals 14*a* and 14*b*** so that the two inverter stages are switched on and off sequentially to produce a stepped output.

As power transistors 11 and 12 alternately turn on, current flows from power source 17 through the turned on transistor through a primary winding **18*p* of transformer 18. Since the current from power source 17 flows alternately through winding 18*p* an amplified form of the input appearing at transformer primary winding 13*p* appears at secondary winding 18*s***.

A diode 21 is connected in parallel with and poled in the opposite direction to the normal direction of current flow through the emitter-collector circuit of transistor 11. Similarly, a diode 22 is connected in parallel with and poled in the opposite direction to the normal direction of current flow through the emitter-collector circuit of transistor 12. The cathode of diodes 21 and 22 are connected to a point 23. Point 23 is connected to the emitters of transistors 11 and 12 through a biasing source 30 at a point 24.

While any direct current source may be applied across points 23 and 24 to forward bias diodes 21 and 22, it is preferred that such source have a low impedance so that the reverse current flows through diode 21, through direct current power source 30, and to source 17 without any instantaneous voltage build-up in the circuit.

In this embodiment, D.C. source 30 comprises a transformer 31 for receiving an A.C. input at terminals **32*a* and 32*b* which appears across a primary winding 31*p*. A corresponding voltage appears across secondary winding 31*s*. Diodes 33 and 34 are connected to rectify the signal appearing at secondary winding 31*s* to make point 24 positive relative to point 23 a predetermined amount to forward bias diodes 21 and 22. A capacitor 35 is connected between the positive and negative terminals of power source 30** to lower its impedance for the conditions appearing in the circuit.

The forward bias on the diodes assures that any reverse current does not create a dangerous voltage across the transistors but is rather substantially instantaneously directed to power source 17. Since power source 17 is normally a battery the reverse current charges the battery. This charging effect substantially offsets the cost of the additional power required for forward biasing the diodes.

While this protection means is advantageous for most systems with reactive loads, it becomes essential for multistage inverters, especially when several stages are used. In the described embodiment the output of the multistage inverter system appears across terminals **19*a* and 19*b*. When transistor 11 is turned on in response to the signal across terminals 14*a* and 14*b*, a current is induced in transformer 18 which also flows through transformer 18'. This current induces current flow in winding 18*p'* and at cyclically recurring times the current is in a reverse direction relative to a transistor turning on in another stage, in this example either transistor 11' or 12'**. This occurs in the same manner between transistors in different inverter stages.

Since the induced currents of the various stages of a multistage inverter system are necessarily substantially high currents, these currents cause high reverse currents in the transistors of other stages of the inverter system. Therefore, the reverse current created across the transistors of other stages are of a magnitude not normally encountered in most single stage inverter systems. However, where large currents flow through a reactive load of a single stage inverter, it is possible that dangerously high reverse currents may be present.

The amount of forward biasing applied to the diodes is determined by the current carrying characteristics relative to voltage of the diodes used and their relationship to the maximum permissible voltage drop across the transistors. Thus, the forward bias is selected so that the maximum anticipated reverse currents create a reverse voltage drop across the emitter-collector circuit of the transistor that does not exceed a safe limit.

In describing the invention, the preferred embodiment has been shown and described, but it is obvious to one skilled in the art that there are many variations, combinations, alterations and modifications that may be made without departing from the spirit of the invention or from the scope of the appended claims.

The embodiments of the invention in which an exclusive property or privilege is claimed are defined as follows:

1. In a circuit wherein a power transistor receives significant reverse currents across its output circuit when turned on, means for limiting the reverse current flow through the transistor comprising:

a diode connected across the output circuit of the transistor, said diode connected to provide a low resistance path for reverse currents to bypass the output circuit of the transistor, and means for substantially continuously forward biasing the diode a preselected amount.

2. A power inverter connected to receive power from a primary power source and connected to receive an alternating control signal, said inverter comprising:

an output transformer;

a first and second output transistor connected in a push-pull arrangement with the output transformer to provide an alternating output derived from the primary source in response to the control signal;

a first diode connected to the output circuit of the first transistor to bypass reverse currents past the first transistor;

a second diode connected to the output circuit of the second transistor to bypass reverse currents past the second transistor; and auxiliary source means connected to said diodes for substantially continuously forward biasing the diodes a preselected amount.

3. A power inverter connected to receive power from a primary power source and connected to receive an alternating control signal, said inverter comprising:

an input transformer for receiving the alternating control signal having a primary and secondary winding, said secondary winding having a first and second end terminal and a tap intermediate the end terminals connected to the primary power source;

an output transformer having a primary and secondary winding, said primary winding having a first and second end terminal and a tap intermediate the end terminal connected to the primary power source;

a first and a second power output transistor;

a direct current source, said direct current source, input transformer, output transformer and power transistor connected in a push-pull arrangement to provide an alternating output at the secondary winding of the output transformer in response to the alternating control signal;

a first diode connected to conduct reverse currents relative to the output circuit of the first transistor past the first transistor;

a second diode connected to conduct reverse currents relative to the output circuit of the second transistor past the second transistor; and an auxiliary power source connected to substantially continuously forward bias the diodes a preselected amount.

4. A power inverter connected to receive power from a primary power source having a first and second terminal and connected to receive an alternating control signal, said inverter comprising:

an input transformer having a primary winding for receiving the alternating control signal as an input and a secondary winding, said secondary winding having a first and second end terminal and a third terminal intermediate the end terminals connected to the first terminal of the primary source;

an output transformer having a primary and secondary winding, said primary winding having a first and second end terminal and a third terminal intermediate the end terminals connected to the second terminal of the primary source;

a first and a second power output transistor each having a first, second and third electrode, said first electrodes each connected to the first terminal of the primary source, said second electrode of the first transistor connected to the first end terminal of the primary winding of the output transformer, said second electrode of the second transistor connected to the second end terminal of the primary winding of the output transformer, said third electrode of the first transistor connected to the first end terminal of the secondary winding of the input transformer, and said third electrode of the second transistor connected to the second end terminal of the secondary winding of the input transformer;

a first and second diode each having a first and second electrode, said first electrode of the first diode connected to the second terminal of the first transistor and said first electrode of the second diode connected to the second electrode of the second transistor;

said first and second diodes connected relative to the first and second transistors respectively in a direction poled to provide a low resistance path for shunting past the transistor currents flowing oppositely to the normal forward current directions through the transistors; and a low impedance electrical source having two terminals with one of said two terminals connected to the first electrodes of the transistors and the other of said terminals connected to the second electrode of the diodes, said auxiliary source providing a substantially continuously selected voltage for forward biasing the diodes to a preselected level.

5. A power inverter connected to receive power from a primary direct current source having a positive and negative terminal, said inverter comprising:

an input transformer having a primary winding for receiving an alternating control signal as an input and a secondary winding, said secondary winding having a center tap connected to the positive terminal of the DC source and a first and second end terminal;

an output transformer having a secondary winding for providing an output and a primary winding, said primary winding having a center tap connected to the negative terminal of the DC source and a first and second end terminal;

a first and a second output PNP transistor each having an emitter, collector and base, said emitters of the transistors connected to the positive terminal of the DC source, said collector terminal of the first transistor connected to the first end terminal of the primary winding of the output transformer, said collector terminal of the second power transistor connected to the second end terminal of the primary winding of the output transformer, said base of the first power transistor connected to the first end terminal of the secondary winding of the input transformer and said base of the second power transistor connected to the second end terminal of the secondary winding of the input transformer;

a first silicon diode having an anode and cathode with its anode connected to the collector of the first transistor;

a second silicon diode having an anode and cathode with its anode connected to the collector of the second transistor; and a low impedance direct current source having its positive terminal connected to the emitters of the transistors and its negative terminal connected to the cathode of the diodes, said auxiliary source having a substantially continuously selected voltage for forward biasing the diodes to a preselected level.

6. An inverter according to claim 5 wherein the primary direct current source is a battery.

7. A power inverter system compring a plurality of power inverter stages all connected to receive power from a primary power source and each inverter stage connected to receive an alternating control signal, each of said inverter stages comprising an output transformer having an output winding;

a first and second output transistor connected in a push-pull arrangement with the output transformer to provide an alternating output derived from the primary source in response to the control signal;

a first diode connected to the output circuit of the first transistor to bypass reverse currents past the first transistor, and a second diode connected to the output circuit of the second transistor to bypass reverse currents past the second transistor;

said power inverter system also comprising auxiliary source means connected to the diodes of each stage for substantially continuously forward biasing the diodes a preselected amount; and said output windings of the output transformers interconnected to provide an inverter system output for a load.

8. A power inverter system comprising a plurality of power inverter stages connected to receive power from a primary source having a first and second terminal and each stage connected to receive an individual alternating control signal, each of said inverter stages comprising an input transformer having a primary winding for receiving each associated individual alternating control signal as an input and a secondary winding, said secondary winding having a first and second end terminal and a third terminal intermediate the end terminals connected to the first terminal of the primary source, an output transformer having a primary and secondary winding, said primary winding having a first and second end terminal and a third terminal intermediate the end terminals connected to the second terminal of the primary source, a first and a second power output transistor each having a first, second and third electrode, said first electrodes each connected to the first terminal of the primary source, said second electrode of the first transistor connected to the first end terminal of the primary winding of the output transformer, said second electrode of the second transistor connected to the second end terminal of the primary winding of the output transformer, said third electrode of the first transistor connected to the first end terminal of the secondary winding of the input transformer, and said third electrode of the second transistor connected to the second end terminal of the secondary winding of the input transformer, a first and second diode each having a first and second electrode, said first electrode of the first diode connected to the second terminal of the first transistor and said first electrode of the second diode connected to the second electrode of the second transistor, and said first and second diodes connected relative to the first and second transistors respectively in a direction poled to provide a low resistance path for shunting past the transistor currents flowing oppositely to the normal forward current direction through the transistors;

said power inverter system also comprising a low impedance electrical source having two terminals with one of said two terminals connected to the first electrodes of all the transistors and the other of said terminals connected to the second electrode of all the diodes, said auxiliary source providing a substantially continuously selected voltage for forward biasing the diodes to a preselected level; and said secondary windings of the output transformers interconnected to provide an inverted system output for a load.

References Cited

UNITED STATES PATENTS

| | | | |
|---|---|---|---|
| 3,044,023 | 7/1962 | Floyd | 331—59 |
| 3,089,076 | 5/1963 | Lee | 321—45 |
| 3,257,604 | 6/1966 | Colclaser et al. | 321—45 |
| 3,260,921 | 7/1966 | Brahm | 321—45 |

JOHN F. COUCH, *Primary Examiner.*

G. GOLDBERG, *Assistant Examiner.*